Patented Nov. 24, 1925.

1,562,510

UNITED STATES PATENT OFFICE.

WILHELM LOMMEL, OF WIESDORF-ON-THE-RHINE, AND HEINRICH MÜNZEL, OF LEVERKUSEN-ON-THE-RHINE, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PROCESS FOR PROTECTING WOOL, FURS, AND OTHER MATERIALS AGAINST ATTACK BY MOTHS.

No Drawing. Application filed May 10, 1924. Serial No. 712,472.

*To all whom it may concern:*

Be it known that we, WILHELM LOMMEL and HEINRICH MÜNZEL, citizens of Germany, residing at Wiesdorf-on-the-Rhine and Leverkusen-on-the-Rhine, in the State of Prussia, Germany, have invented new and useful Improvements in Processes for Protecting Wool, Furs, and Other Materials Against Attack by Moths, of which the following is a specification.

The method hitherto employed for protecting wool, furs, and other materials from the ravages of moths has been to place among them substances such as naphthalene, camphor or pepper, possessing a penetrating odour; these substances remain of course efficacious only so long as their odour persists.

The present invention relates to a new process whereby materials liable to be attacked by moths can be permanently and completely protected.

According to this invention the materials to be protected from moths are treated with chemical substances containing the following group:

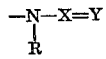

wherein R represents hydrogen or a radical, such as ethyl, methyl, phenyl, acetyl, benzoyl; X represents nitrogen or carbon and Y represents nitrogen, carbon or a nuclear radical.

In order to illustrate our invention we mention by way of examples the following substances among others:

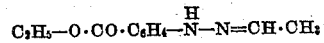

ethylidenephenylcarboxylic-acid-ethylester-hydrazone,

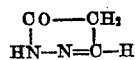

pyrazolone,

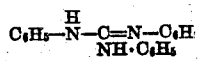

triphenylguanidine,

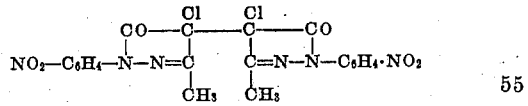

bis-nitrophenylmethyl-pyrazolone-chloride,

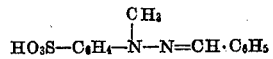

benzylidene - phenylmethylhydrazone - sulfonic acid,

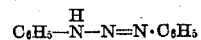

diazoaminobenzene, and carbazoles such as

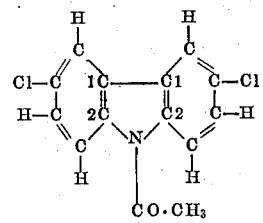

acetyldichlorocarbazole. In this compound the CO.CH₃ group corresponds to the R, the N corresponds to the N and one or the other of the pairs of carbon atoms marked 1 and 2 of the two benzene rings corresponds to the X and Y of the formula

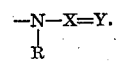

The effective group

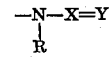

may be present in the substance twice or several times.

These moth repelling substances (in practice dissolved in a suitable solvent, e. g. benzene) are applied to the material in question in any suitable manner, e. g. by spraying the solution upon the wool etc. or immersing the wool etc. into a solution. It appears that even small quantities suffice to ensure complete protection of the wool, furs or other materials.

We claim:—

1. The herein described process for protecting wool, furs and other materials against attack by moth which consists in depositing in or upon the material to be protected a moth-repelling agent by treating the material with a chemical substance containing the group $$-\underset{R}{N}-X=Y$$

wherein R represents hydrogen or a radical, X represents nitrogen or carbon and Y represents nitrogen, carbon or a nuclear radical.

2. A moth-proof material of fabric consisting of a material or fabric liable to be attacked by moths, having incorporated or combined therewith a moth-repelling chemical substance containing the group $$-\underset{R}{N}-X=Y$$

wherein R represents hydrogen or a radical, X represents nitrogen or carbon and Y represents nitrogen, carbon or a nuclear radical.

In testimony whereof we have hereunto set our hands.

WILHELM LOMMEL.
HEINRICH MÜNZEL.